(12) United States Patent
Eling

(10) Patent No.: US 6,211,258 B1
(45) Date of Patent: Apr. 3, 2001

(54) PROCESS FOR PREPARING RIGID AND FLEXIBLE POLYURETHANE FOAMS

(75) Inventor: Berend Eling, Bertem (BE)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 09/513,823

(22) Filed: Feb. 25, 2000

Related U.S. Application Data

(62) Division of application No. 08/963,753, filed on Nov. 4, 1997, now Pat. No. 6,100,311.

(30) Foreign Application Priority Data

Nov. 8, 1996 (EP) .................................................. 96203133

(51) Int. Cl.$^7$ ................................................. C08G 18/14
(52) U.S. Cl. ........................... 521/170; 264/45.1; 264/51; 521/123; 521/155; 521/159; 521/160; 521/174
(58) Field of Search ..................................... 521/155, 123, 521/159, 160, 170, 174; 264/45.1, 51

(56) References Cited

U.S. PATENT DOCUMENTS

| 4,256,841 | 3/1981 | Horacek et al. . |
| 5,519,068 | 5/1996 | Okada et al. . |
| 5,552,450 | 9/1996 | Hinz et al. . |
| 5,688,835 | 11/1997 | Scherbel et al. . |
| 6,100,311 | * 8/2000 | Eling ..................................... 521/155 |

FOREIGN PATENT DOCUMENTS

| 006 150 | 1/1980 | (EP) . |
| 603 597 | 6/1994 | (EP) . |
| 2 028 348 | 3/1980 | (GB) . |

OTHER PUBLICATIONS

Christfreund et al., "Amine–Free Catalyst Systems for Automotive Instrument Panels," Journal of Cellular Plastics, vol. 28, No. 2, Apr. 1992, pp. 160–174.

* cited by examiner

*Primary Examiner*—John M. Cooney, Jr.
(74) *Attorney, Agent, or Firm*—Pillsbury Winthrop LLP

(57) ABSTRACT

The use of a tin salt together with a salt of a protic acid having at least 2 acidic hydrogen atoms and a $pK_a$ in water of 2-10 in preparing water-blown polyurethane foams.

17 Claims, No Drawings

PROCESS FOR PREPARING RIGID AND FLEXIBLE POLYURETHANE FOAMS

This is a division of application Ser. No. 08/963,753, filed Nov. 4, 1997 now U.S. Pat. No. 6,100,311.

The present invention is concerned with a process for preparing water-blown polyurethane foams using a certain catalyst and the foams so obtained.

The preparation of water-blown polyurethane foams by reacting a polyisocyanate and a polyol and using water as blowing agent is widely known. The isocyanate groups react with the hydroxyl groups of the polyol to form urethane groups and with the water to form urea groups while liberating $CO_2$ which is responsible for the foaming. Such processes are used to prepare e.g. flexible foams, open-celled rigid foams and microcellular elastomers.

It is further widely known to use a catalyst or a catalyst package to enhance these reactions. Widely used catalysts are tertiary amines like diaminobicyclooctane and N,N,-dimethylaminoethanol, lead compounds like lead octoate and tin compounds like dibutyltin dilaurate and stannous carboxylates like stannous octoate; see e.g. The ICI Polyurethanes Book of George Woods—J. Wiley and sons—1987; page 27–45.

U.S. Pat. No. 5,426,124 discloses the preparation of polyurethane foam moldings having a density of at least 120 kg/m$^3$ wherein certain acids, as citric acid, are used as blowing agents.

U.S. Pat. No. 4,430,490 and U.S. Pat. No. 4,468,478 disclose the use of certain hydroxy carboxylic acids in order to eliminate the effects of alkaline catalysts in polyether polyols. The polyols are used to prepare foams using an amine as catalyst and FREON™ 11B as blowing agent (U.S. Pat. No. 4,430,490); in U.S. Pat. No. 4,468,478 the polyols have been used to prepare flexible foams using an amine catalyst, and to prepare a rigid polyurethane using stannous octoate wherein the acid was potassium salicylate and no blowing agent was used, and a rigid polyurethane foam using an amine catalyst and FREON 11 as blowing agent.

U.S. Pat. No. 5,132,333 discloses the use of alkali metal salt or alkaline earth metal salt of a hydroxy carboxylic acid in order to decrease the hardness of flexible polyurethane foams. A compound like disodium and trisodium citrate is used to prepare water-blown flexible foams using amines and tin compounds as catalysts, the amount of the acid being considerably greater than the amount of tin compounds.

U.S. Pat. No. 4,764,541 discloses the use of polyether acids in preparing flexible polyurethane foams using amine catalysts in order to slow down the polyurethane reaction; the system becomes reactive at higher temperature.

U.S. Pat. No. 4,686,240 discloses the use of a foam modifier which is an alkali metal or alkaline earth metal salt, the anion being the anion of a Brönsted acid having a pKa of greater than 1 in order to improve the stability and green strength of water-blown flexible polyurethane foams. As foam modifiers metal hydroxides, alkoxides, inorganic acids and monocarboxylic and polycarboxylic acids have been mentioned. In the preparation of the foams amine catalysts are used optionally together with tin catalysts; in case a tin catalyst was used the amount of tin catalyst was considerably lower than the amount of foam modifier, which was a potassium salt of succinic anhydride half acid of a polyol.

U.S. Pat. No. 5,124,369 discloses the use of polyelectrolytes as polyacrylic salts to lower the hardness of water-blown flexible foams. The foams made are based on toluene diisocyanate and as catalysts amine compounds and tin compounds are used. Applicant has conducted similar experiments using MDI as polyisocyanate; these experiments did not confirm the hardness reduction for MDI-based flexible foams.

Although satisfactory products have been made in the past room for improvement exists. In particular it was found that when tin catalysts are used the final foam shows thermal degradation, resulting in less favourable physical properties of the foam. There is a need to reduce such degradation or to avoid it.

Surprisingly we have found that such degradation may be reduced by using a novel catalyst composition.

Therefore the present invention is concerned with the use of a tin salt of a carboxylic acid having 2–18 carbon atoms (hereinafter called "catalyst 1"), together with a lithium, sodium, potassium, rubidium, cesium, magnesium, calcium, strontium and/or barium salt of a protic acid, the acid having at least 2 acidic hydrogen atoms and having a $pK_a$ in water 2-10 (hereinafter called "catalyst 2"), in a ratio of catalyst 1: catalyst 2 of 30:70 to 95:5 and in an amount of catalyst 1 and catalyst 2 of each 0.1–5% by weight (calculated on the weight of all ingredients used to prepare the foam) in the preparation of water-blown polyurethane foams with the proviso that the use of salts of polyelectrolytes in preparing flexible foams using toluene diisocyanate as the polyisocyanate and an amine catalyst are excluded.

For simplicity reasons the above salts of the protic acids are called "catalyst 2"; it is to be noted however that these compounds in fact have a deactivating effect upon catalyst 1.

Further the present invention is concerned with the preparation of polyurethane foams by reacting a polyisocyanate and a polyol in the presence of water and the above catalysts 1 and 2.

Without wishing to be bound by any theory it is believed that catalyst 2 supresses the formation of certain intermediate tin compounds during the preparation of the foam, which intermediate tin compounds would enhance certain undesirable hydrolytic processes which lead to said degradation.

The weight ratio of catalysts 1 and 2 as used in this process may range preferably from 50:50 to 90:10.

The carboxylic acid in catalyst 1 may be selected from saturated or unsaturated aliphatic, cycloaliphatic and araliphatic hydrocarbons and from aromatic hydrocarbons having one carboxylic acid groups. Preferably they have 2–18 carbon atoms. Most preferred monocarboxylic acids are the saturated aliphatic carboxylic acids having 2–12 carbon atoms, like acetic acid, propionic acid, n-butyric acid, isobutyric acid, n-valeric acid, caproic acid, heptanoic acid, octanoic acid, nonanoic acid, decanoic acid, undecanoic acid and dodecanoic acid. Examples of tin catalysts of this type are dibutyltin dilaurate and stannous octoate.

The protic acid of catalyst 2 may be selected from a wide range of compounds. Preferably such compounds are selected from those containing at least 2 groups selected from —COOH and aromatic thiol.

Preferably the number of acidic hydrogen atoms is at least 3. Different metal salts may be used in combination. Further metal salts may be used wherein -all or only a part of the acidic hydrogens has been replaced by themetal ion. Preferably 10–90% of the acidic hydrogen atoms has been replaced with the metal ion; when the acid is used instead of its salt more tin catalyst is required in order to obtain the same gel time and when all acidic hydrogen atoms have been replaced with the metal ion scorching of the foam was observed when making bigger buns, e.g. from 1800 g material. Most preferred salts are the K- and Na-salts.

Preferably catalyst 2 has a solubility in water of at least 5 gram of catalyst 2 per liter water at 25° C.

Examples of useful catalysts are the Li, Na, K, Rb, Cs, Mg, Ca, Sr and/or Ba salts of:citric acid, 1,2,4,5 benzene-tetracarboxylic acid (BCTA), ethylene-diaminetetraacetic acid (EDTA), ethylenebis-(oxyethylene-nitrilo)tetraacetic acid (EGTA). N-(2-hydroxyethyl)-ethylenediaminetriacetic acid (HEDTA), 1,3-diamino-2-hydroxypropane-N,N,N',N'-tetraacetic acid (DHPTA), 2-merca-ptobenzoic acid (MBA), 2,2'-thiodiglycolic acid (TDGA), poly(acrylic acid) (PAcA), poly(2-acrylamido-2-methyl-1-propanesulfonic acid) (PAcAmMPSA), copolymers of acrylamide and acrylic acid (PAcAm-co-PAcA), of acrylic acid and maleic acid (PAcA-co-PMA), of vinylpyrrolidone and acrylic acid (PVP-co-PAcA), said polymers and copolymers having average molecular weights between 500 and 1000000, preferably between 1000 and 500000.

The amount of catalyst 1 and catalyst 2 preferably varies from 0.2 to 3% by weight calculated on the weight of all ingredients used to prepare the polyurethane foam.

For preparing the water-blown polyurethane foams according to the present invention the polyisocyanates and isocyanate-reactive compounds known in the art may be used. The amounts of the polyisocyanate, the isocyanate-reactive compounds and the water may vary in known manner. The foams made may be rigid, flexible or micro-cellular elastomers. Additives commonly known in the art to prepare such foams, may be used in the process according to the invention. Examples of such additives are fire- and flame retardants, stabilisers, antioxidants, other catalysts, colorants, chain extenders and cross-linkers.

Catalysts 1 and 2 are preferably mixed with the isocyanate-reactivecompounds before the foaming reaction takes place. More preferably catalyst 1 is mixed with a part of the isocyanate-reactive compounds and catalyst 2 is mixed with another part of the isocyanate-reactive compounds; subsequently these mixtures are fed to a mixing head of a foaming device where they are mixed with the polyisocyanate.

Suitable organic polyisocyanates for use in the process of the present invention include any of those known in the art for the preparation of rigid and flexible polyurethane foams and microcellular elastomers, like aliphatic, cycloaliphatic, araliphatic and, preferably, aromatic polyisocyanates, such as toluene diisocyanate in the form of its 2,4 and 2,6-isomers and mixtures thereof and diphenylmethane diisocyanate in the form of its 2,4'-, 2,2'- and 4,4'-isomers and mixtures thereof, the mixtures of diphenylmethane diisocyanates (MDI) and oligomers thereof having an isocyanate functionality greater than 2 known in the art as "crude" or polymeric MDI (polymethylene polyphenylene polyisocyanates), the known variants of MDI comprising urethane, allophanate, urea, biuret, carbodiimide, uretonimine and/or isocyanurate groups.

Mixtures of toluene diisocyanate and diphenylmethane diisocyanate and/or polymethylene polyphenylene polyisocyanates may be used.

Preferably MDI, crude or polymeric MDI and/or liquid variants thereof are used said variants being obtained by introducing uretonimine and/or carbodiimide groups into said polyisocyanates, such a carbodiimide and/or uretonimine modified polyisocyanate having an NCO value of at least 20% by weight, and/or by reacting such a polyisocyanate with one or more polyols having a hydroxyl functionality of 2–6 and a molecular weight of 62–500 so as to obtain a modified polyisocyanate having an NCO value of at least 20% by weight.

In as far as flexible foams are made using salts of polyelectrolytes and an amine catalyst the use of toluene diisocyanate as the sole polyisocyanate is excluded.

Isocyanate-reactive compounds include any of those known in the art for that purpose like polyamines, aminoalcohols and polyols. Of particular importance are polyols and polyol mixtures havinghydroxyl numbers of 10 to 500 mg KOH/g and an average nominal hydroxyl finctionality of from 2 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example ethylene glycol, diethylene glycol, propylene glycol, dipropylene glycol, butane diol, glycerol, trimethylolpropane, triethanolamine, pentaerythritol, sorbitol and sucrose; polyamines, for example ethylene diamine, tolylene diamine, diaminodiphenylmethane and polymethylene polyphenylene polyamines; and aminoalcohols, for example ethanolamine and diethanolamine; and mixtures of such initiators. Other suitable polyols include polyesters obtained by the condensation of appropriate proportions of glycols and higher functionality polyols with polycarboxylic acids. Still further suitable polyols include hydroxyl terminated polythioethers, polyamides, polyesteramides, polycarbonates, polyacetals, polyolefins and polysiloxanes. Further chain extenders and cross-linkers may be used like ethylene glycol, diethylene glycol, propylene glycol, dipropylene glycol, butane diol, glycerol, trimethylolpropane, ethylene diamine, ethanolamine, diethanolamine, triethanolamine, tolylene diamine, diaminodiphenylmethane, polymethylene polyphenylene polyamines, pentaerythritol, sorbitol and sucrose. Mixtures of such isocyanate-reactive compounds may be used as well.

The amount of water used may range from 1–20 parts by weight per 100 parts by weight of other isocyanate-reactive ingredients.

The isocyanate index may vary widely and may range from 40–300.

The foams may be made according to the so-called one-shot method, the quasi- or semi-prepolymer method or the prepolymer method.

The foams made may be rigid or flexible foams or microcellular elastomers. They may be used for insulation purposes, in theconstruction of buildings, as cushioning in furniture or car seats, in shoe-soling and autoparts like bumpers. The foams preferably have a core density (ISO/DIS 845) of 3–100 kg/m$^3$ and more preferably of 3–80 kg/m$^3$.

The present invention is in particular concerned with the preparation of foams described in co-pending application PCT/EP9601594.

The remainder of this description is related to the preparation of such foams using catalyst 1 and 2.

Conventional flexible polyurethane foams are widely known. Such foams show a relatively high resilience (ball rebound), a relatively low modulus, a relatively high sag factor and a relatively low hysteresis loss. Such foams further show a major glass-rubber transition below ambient temperature, generally in the temperature range of −100° C, to −10° C. The commonly applied relatively high molecular weight polyether and polyester polyols in such foams are responsible for the sub-ambient glass transition temperature ($Tg^s$). These polyether and polyester polyols are often referred to as soft segments. Above $Tg^s$ the foam displays its typical flexible properties until softening and/or melting of the isocyanate-derived urethane/urea clusters ("hard domains") takes place. This softening and/or melting temperature ($Tg^h$ and /or $Tm^h$) often coincides with the onset of thermal degradation of polymer segments. The $T^h$ and /or $Tm^h$ for flexible polyurethane foams is generally higher than 100° C., often even exceeding 200° C. At the $Tg^s$ a sharp decrease of the modulus of the flexible foam is observed. Between $Tg^s$ and $Tg^h/Tm^h$ the modulus remains fairly constant with increasing temperature and at $Tg^h/Tm^h$ again a substantial decrease of the modulus may take place. A way of expressing the presence of $Tg^s$ is to determine the ratio of the Young's storage modulus E at −100° C. and +25° C. as per Dynamic Mechanical Thermal Analysis (DMTA measured according to ISO/DIS 6721-5). For conventional flexible polyurethane foams the $$\frac{E' - 100°\,C.}{E' + 25°\,C.}$$

ratio is at least 25.

Another feature of $Tg^s$ by DMTA (ISO/DIS 6721-5) is that for conventional flexible polyurethane foams the maximum value of the ratio of $$\frac{\text{Young's loss modulus } E''}{\text{Young's storage modulus } E'}(\tan_{\delta max})$$

over the −100° C./+25° C. temperature range varies from 0.20–0.80 in general. The Young's loss modulus E" is measured by DMTA (ISO/DIS 6721-5) as well.

In copending patent application PCT/EP9601594 a completely new class of flexible polyurethane foams is described such foams having no major glass-rubber transition between −100° C. and +25° C. In more quantitative terms these foams show a ratio $E'_{-100°\,C.}/E'_{+25°\,C.}$ of 1.3 to 15.0, preferably of 1.5 to 10 and most preferably of 1.5 to 7.5. The $\tan_{\delta max}$ over the −100° C. to +25° C. temperature range is below 0.2.

The apparent core density of such foams may range from 4–30 kg/m³ and preferably ranges from 4–20 kg/m³ (measured according to ISO/DIS845). Such foams are made by crushing a rigid foam.

In the context of the present application hereinafter a flexible polyurethane foam is a crushed foam having a ball rebound (measured according to ISO 8307) of at least 40%, preferably at least 50% and most preferably 55–85% in at least one of the three dimensional directions and a sag factor (CLD 65/25) of at least 2.0 (measured according to ISO 3386/1). Preferably such flexible foams have a Young's storage modulus at 25° C. of at most 500 kPa, more preferably at most 350 kPa and most preferably between 10 and 200 kPa (Young's storage modulus measured by DMTA according to ISO/DIS 6721-5). Further, such flexible foams preferably have a sag factor (CLD 65/25) of at least 3.5 and most preferably 4.5–10 (measured according to ISO 3386/1). Still further such flexible foams preferably have a CLD hysteresis loss (ISO 3386/1) of below 55%, more preferably below 50% and most preferably below 45%.

In the context of the present patent application hereinafter a rigid polyurethane foam is an uncrushed foam having a ball rebound measured in the direction of foam rise of less than 40% (ISO 8307 with the proviso that no preflex conditioning is applied, that only one rebound value per sample is measured and that test pieces are conditioned at 23° C. ±2° C. and 50 ±5% relative humidity) and/or having a CLD 65/25 sag factor measured in the direction of foam rise of less than 2.0 (ISO 338611 with the proviso that the sag factor is determined after the first load—unload cycle); these properties both being measured at a core density of the foam of 3–27 kg/m³ (ISO 845). Preferably the ratio $E'_{-100°\,C.}/E'_{+25°\,C.}$ of such a rigid foam is 1.3–15. If in the present application ISO 8307 and ISO 3386/1 are mentioned in relation to rigid foams they refer to the tests as described above including the provisos.

In the context of the present invention the following terms have the following meaning:

1) isocyanate index or NCO index or index: the ratio of NCO-groups over isocyanate-reactive hydrogen atoms present in a formulation, given as a percentage:

$$\frac{[NCO] \times 100}{[\text{active hydrogen}]}(\%).$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce modified polyisocyanates (including such isocyanate-derivatives referred to in the art as quasi or semi-prepolymers and prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of the water) present at the actual foaming stage are taken into account.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual foaming process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanates are kept in one or more containers separate from the isocyanate-reactive components.

4) The expression "polyurethane foam" as used herein refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams) and with polyols, aminoalcohols and/or polyamines as isocyanate-reactive compounds.

5 5) The term "average nominal hydroxyl functionality" is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

6) The word "average" refers to number average unless indicated otherwise.

7) $pK_a$ refers to the strength of a protolyte compared to that of water ($pK_a = -\log K_a$ wherein $K_a$ is the dissociation constant of the acid or the salt).

The present invention is concerned with the preparation of such rigid and flexible foams using catalyst 1 and 2 and/or the protic acid of catalyst 2.

The foams according to the present invention are prepared by reacting a polyisocyanate (1), an isocyanate-reactive compound (2), said compound (2) having an average equivalent weight of at most 374 and an average number of isocyanate-reactive hydrogen atoms of from 2 to 8, an isocyanate-reactive compound (3), said compound (3) having an average equivalent weight of more than 374 and an average number of isocyanate-reactive hydrogen atoms of from 2 to 6 and water in the presence of catalyst 1 and catalyst 2 and/or the protic acid of catalyst 2 to prepare a rigid polyurethane foam and by crushing this rigid polyurethane foam to prepare a flexible polyurethane foam.

Further the present invention is concerned with reaction systems comprising the above ingredients. The present invention is also concerned with a composition comprising isocyanate-reactive compound 2, water and catalyst 2 and/or the protic acid of catalyst 2.

More in particular the foams according to the present invention are prepared by reacting a polyisocyanate (1), a polyol (2) having a hydroxyl number of at least 150 mg KOH/g and an average nominal hydroxyl functionality of from 2 to 8, a polyol (3) having a hydroxyl number of from 10 to less than 150 mg KOH/g and an average nominal hydroxyl functionality of from 2 to 6 and water in the presence of catalyst 1 and catalyst 2 and/or the protic acid of catalyst 2 to prepare a rigid polyurethane foam and by crushing this rigid polyurethane foam to prepare a flexible polyurethane foam.

Suitable organic polyisocyanates for use in the process of the present invention include any of those known in the art for the preparation of rigid polyurethane foams, like aliphatic, cycloaliphatic, araliphatic and, preferably, aromaticpolyisocyanates, such as toluene diisocyanate in the form of its 2,4 and 2,6-isomers and mixtures thereof and diphenylmethane diisocyanate in the form of its 2,4'-, 2,2'- and 4,4'-isomers and mixtures thereof, the mixtures of diphenylmethane diisocyanates (MDI) and oligomers thereof having an isocyanate functionality greater than 2 known in the art as "crude" or polymeric MDI (polymethylene polyphenylene polyisocyanates), the known variants of MDI comprising urethane, allophanate, urea, biuret, carbodiimide, uretonimine and/or isocyanurate groups.

Mixtures of toluene diisocyanate and diphenylmethane diisocyanate and/or polymethylene polyphenylene polyisocyanates may be used. Most preferably polyisocyanates are used which have an average isocyanate finctionality of 2.1–3.0 and preferably of 2.2–2.8.

Preferably MDI, crude or polymeric MDI and/or liquid variants thereof are used said variants being obtained by introducing uretonimine and/or carbodiimide groups into said polyisocyanates, such a carbodiimide and/or uretonimine modified polyisocyanate having an NCO value of at least 20% by weight, and/or by reacting such a polyisocyanate with one or more polyols having a hydroxyl functionality of 2–6 and a molecular weight of 62–500 so as to obtain a modified polyisocyanate having an NCO value of at least 20% by weight.

Isocyanate-reactive compounds (2) include any of those known in the art for that purpose like polyamines, aminoalcohols and polyols. Of particular importance for the preparation of the rigid foams are polyols and polyol mixtures having hydroxyl numbers of at least 150 mg KOH/g and an average nominal hydroxyl finctionality of from 2 to 6. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example ethylene glycol, diethylene glycol, propylene glycol, dipropylene glycol, butane diol, glycerol, trimethylolpropane, triethanolamine, pentaerythritol, sorbitol and sucrose; polyamines, for example ethylene diamine, tolylene diamine,diaminodiphenylmethane and polymethylene polyphenylene polyamines; and aminoalcohols, for example ethanolamine and diethanolamine; and mixtures of such initiators. Other suitable polyols include polyesters obtained by the condensation of appropriate proportions of glycols and higher functionality polyols with polycarboxylic acids. Still further suitable polyols include hydroxyl terminated polythioethers, polyamides, polyesteramides, polycarbonates, polyacetals, polyolefins and polysiloxanes. Still further suitable isocyanate-reactive compounds include ethylene glycol, diethylene glycol, propylene glycol, dipropylene glycol, butane diol, glycerol, trimethylolpropane, ethylene diamine, ethanolamine, diethanolamine, triethanolamine and the other initiators mentioned before. Mixtures of such isocyanate-reactive compounds may be used as well. Most preferably polyols are used which do not comprise primary, secondary or tertiary nitrogen atoms.

Isocyanate-reactive compounds (3) include any of those known in the art for that purpose, like polyamines, aminoalcohols and polyols.

Of particular importance for the preparation of the rigid foams are polyols and polyol mixtures having a hydroxyl value of 10 to less than 150 and preferably of 15–60 mg KOH/g and an average nominal hydroxyl finctionality of from 2 to 6 and preferably of from 2 to 4. These high molecular weight polyols are generally known in the art and include reaction products of alkylene oxides, for example ethylene oxide and/or propylene oxide, with initiators containing from 2 to 6 active hydrogen atoms per molecule. Suitable initiators include: polyols, for example ethylene glycol, diethylene glycol, propylene glycol, dipropylene glycol, butane diol, glycerol, trimethylolpropane, triethanolamine, pentaerythritol and sorbitol; polyamines, for example ethylene diamine, tolylene diamine, diaminodiphenylmethane and polymethylene polyphenylene polyamines; and aminoalcohols, for example ethanolamine and diethanolamine; and mixtures of such initiators. Other suitable polyols include polyesters obtained by the condensation of appropriate proportions of glycols and higher functionality polyols with polycarboxylic acids. Still further suitable polyols include hydroxyl terminatedpolythioethers, polyamides, polyesteramides, polycarbonates, polyacetals, polyolefins and polysiloxanes. Preferred polyols are the polyether polyols comprising ethylene oxide and/or propylene oxide units and most preferably polyoxyethylene polyoxypropylene polyols having an oxyethylene content of at least 10% and preferably 10–85% by weight. Other polyols which may be used comprise dispersions or solutions of addition or condensation polymers in polyols of the types described above. Such modified polyols, often referred to as "polymer" polyols have been fully described in the prior art and include products obtained by the in situ polymerisation of one or more vinyl monomers, for example styrene and acrylonitrile, in polymeric polyols, for example polyether polyols, or by the in situ reaction between a polyisocyanate and an amino- or hydroxy-functional compound, such as triethanolamine, in a polymeric polyol.

The polymer modified polyols which are particularly interesting in accordance with the invention are products obtained by in situ polymerisation of styrene and/or acrylonitrile in polyoxyethylene polyoxypropylene polyols and products obtained by in situ reaction between a polyisocyanate and an amino or hydroxy-functional compound (such as triethanolamine) in a polyoxyethylene polyoxypropylene polyol. Polyoxyalkylene polyols containing from 5 to 50% of dispersed polymer are particularly useful. Particle sizes of the dispersed polymer of less than 50 microns are preferred. Mixtures of such isocyanate-reactive compounds may be used as well. Most preferably polyols are used which do not comprise primary, secondary or tertiary nitrogen atoms.

The relative amount of isocyanate-reactive compound (2) and (3) or polyol (2) and (3) may vary widely and preferably ranges from 0.1:1 to 4:1 (w:w).

The relative quantities of the polyisocyanate and the isocyanate-reactive compounds to be reacted may vary within a wide range. In general an isocyanate index will be applied of from 25 to 300, preferably of from 30 to 200 and most preferably of from 102 to 150.

In order to prepare a foam water is used as a blowing agent. However if the amount of water is not sufficient to obtain the desired density of the foam any other known way to prepare polyurethane foams may be employed additionally, like the use of reduced or variable pressure, the use of a gas like air, $N_2$ and $CO_2$, the use of more conventional blowing agents like chlorofluorocarbons, hydrofluorocarbons, hydrocarbons and fluorocarbons, the use of other reactive blowing agents, i.e. agents which react with any of the ingredients in the reacting mixture and due to this reaction liberate a gas which causes the mixture to foam and the use of catalysts which enhance a reaction which leads to gas formation like the use of carbodiimide-formation-enhancing catalysts such as phospholene oxides. Combinations of these ways to make foams may be used as well. The amount of blowing agent may vary widely and primarily depends on the desired density. Water may be used as liquid at below-ambient, ambient or elevated temperature and as steam.

A preferred combination of blowing agent is water and $CO_2$ wherein the $CO_2$ is added to the ingredients for making the foam in the mixing head of a device for making the foam, to one of the isocyanate-reactive ingredients and preferably to the polyisocyanate before the polyisocyanate is brought into contact with the isocyanate-reactive ingredients.

Per 100 parts by weight of polyisocyanate (1), isocyanate-reactive compound (2) and compound (3) or polyol (2) and polyol (3) and water, preferably the amount of compound (2) or polyol (2) ranges from 2–20 parts by weight, the amount of compound (3) or polyol (3) ranges from 5–35 parts by weight and the amount of water ranges from 1 to 17 parts by weight, the remainder being polyisocyanate. Most preferably these amounts are 55–80, 3–20, 10–30 and 2–6 parts by weight for the polyisocyanate, polyol (2), polyol (3) and water respectively. This encompasses another aspect of the invention: if a cyclic polyisocyanate and more in particular an aromatic polyisocyanate and most in particular an MDI or polymethylenepolyphenylene polyisocyanate is used the content of cyclic and more in particular of aromatic residues in the flexible foam is relatively high as compared to conventional flexible polyurethane foams. The foams according to the invention preferably have a content of benzene rings, derived from aromatic polyisocyanates, which is 30 to 56 and most preferably 35 to 50% by weight based on the weight of the foam. Since polyols, polymer polyols, fire retardants, chain extenders and/or fillers which contain benzene rings may be used, the overall benzene ring content of the flexible foam may be higher and preferably ranges from 30 to 70 and most preferably from 35 to 65% weight as measured by calibrated Fourier Transform Infra Red Analysis.

The present invention is more in particular concerned with a process for preparing rigid polyurethane foams by reacting a polyisocyanate (1), a polyether polyol (2) having a hydroxyl number of at least 150 mg KOH/g and an average nominal hydroxyl functionality of from 2 to 8, a polyether polyol (3) having a hydroxyl number of from 10 to less than 150 mg KOH/g and an average nominal hydroxyl functionality of from 2 to 6 and water, wherein the amount of polyisocyante (1), polyol (2), polyol (3) and water is 55–80, 3–20, 10–30 and 2–6 parts by weight respectively per 100 parts by weight of polyisocyanate (1), polyol (2), polyol (3) and water, in the presence of catalyst 1 and catalyst 2 and/or the protic acid of catalyst 2 and wherein the reaction is conducted at an isocyanate index of 102–150 and wherein the polyisocyanate is reacted with one or more isocyanate-reactive compositions comprising one or more of the aforementioned polyol (2), polyol (3) and water and not comprising compounds which have a primary, secondary or tertiary nitrogen atom, with the exception of catalyst 2 and/or the protic acid of catalyst 2.

This preferred process gives foams with reduced thermal degradation, especially when such foams are made as large buns e.g. on a moving conveyor belt (slab-stock foam), the foams have improved stability and a low amount of extractables.

An even further preferred process is a process for preparing a rigid foam by reacting a polyisocyanate (1), a polyether polyol (2) having an average equivalent weight of 70–300 and preferably of 70–150, having an average nominal hydroxyl functionality of from 2 to 6 and preferably from 2 to 3 and an oxyethylene content of at least 75% by weight, a polyether polyol (3) having an average equivalent weight of 1000–3000, having an average nominal hydroxyl functionality of 2 to 3 and preferably of 2 and having the structure

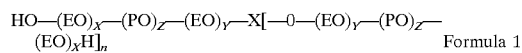

Formula 1 wherein EO is an ethylene oxide radical, PO is a propylene oxide radical, x=1–15 and preferably 3–10, y=0–6 and preferably 1–4, z is such so as to arrive at the above equivalent weight, n=1–2 and X is a hydrocarbon radical having 2–10 and preferably 2–6 carbon atoms or a radical having the formula $-CH_2-CH_2-(OCH_2-CH2)_{1-2}-$, and water wherein the amount of polyisocyanate (1), polyol (2), polyol (3) and water is 55–80, 3–20, 10–30 and 2–6 parts by weight respectively per 100 parts by weight of polyisocyanate (1), polyol (2), polyol (3) and water and wherein the reaction is conducted at an isocyanate index of 102–200 and preferably of 102–150 and wherein the polyisocyanate is reacted with one or more isocyanate-reactive compositions comprising one or more of the aforementioned polyol (2), polyol (3) and water and not comprising compounds which have a primary, secondary or tertiary nitrogen atom, with the exception of catalyst 2 and/or the protic acid of catalyst 2. Preferably the amount of water is 3–5 parts by weight calculated on the same basis as above. Preferably the weight ratio of water and polyol (3) is 0.1 to 0.4:1 and the weight ratio of polyol (3) and of polyol (2) +water is 0.9–2.5:1

Most preferred polyether polyols (3) are those according to formula 1, described hereinbefore. Those having a nominal hydroxyl functionality of 3 may be prepared by ethoxylation of an initiator, followed by propoxylation and again ethoxylation, wherein the initiator is a triol like glycerol and/or trimethylol propane. Those having a nominal hydroxyl finctionality of 2 may be prepared by ethoxylation of ethylene glycol, diethylene glycol and/ortriethylene glycol, followed by propoxylation and again ethoxylation; or by propoxylation of ethylene glycol, diethylene glycol and/or triethylene glycol followed by ethoxylation; or by propoxylation of a polyoxyethylene polyol having 4–15 oxyethylene groups followed by ethoxylation. Mixtures of such most preferred polyols may be used as well. Although not necessary other polyols may be used together with these most preferred polyols according to formula 1, provided the amount does not exceed 30% by weight based on the weight of these polyols according to formula 1. Such polyols according to formula 1 are commercially available (e.g. Daltocel F 430 from imperial Chemical Industries PLC).

In addition to the polyisocyanate, the isocyanate-reactive compounds and the blowing agent, one or more auxiliaries or additives known per se for the production of polyurethane foams may be used. Such optional auxiliaries or additives include foam-stabilizing agents or surfactants, for example siloxane-oxyalkylene copolymers and polyoxyethylene polyoxypropylene block copolymers and fire retardants, for example halogenated alkyl phosphates such as tris chloropropyl phosphate, melamine and guanidine carbonate, antioxidants, anti-static agents, UV stabilisers, anti-microbial and anti-fungal compounds and fillers like latex, TPU, silicates, barium and calcium sulphates, chalk, glass fibers or beads and polyurethane waste material. Preferbably additives and auxiliaries are used which do not comprise primary, secondary or tertiary nitrogen atoms.

In operating the process for making rigid foams according to the invention, the known one-shot, prepolymer or semi-prepolymer techniques may be used together with conventional mixing methods and the rigid foam may be produced in the form of slabstock, mouldings including foam in fabric and pour-in-place applications, sprayed foam, frothed foam or laminates with other materials such as hardboard, plasterboard, plastics, paper or metal or with other foam layers.

It is convenient in many applications to provide the components for polyurethane production in pre-blended formulations based on each of the primary polyisocyanate and isocyanate-reactive components. In particular, an isocyanate-reactive composition may be used which contains the auxiliaries, additives and the blowing agent in addition to the isocyanate-reactive compounds (2) and (3) in the form of a solution, an emulsion or dispersion.

The isocyanate-reactive components may also be supplied independently to the polyisocyanate as two or more compositions containing the additives and auxiliaries; e.g. one composition comprising catalyst 2 and/or the protic acid of catalyst 2, water and polyol (2) and another composition comprising polyol (3), catalyst 1 and antioxidant may be fed from different storage tanks into the mixing head of a device for making foam, in which mixing head they are mixed with the polyisocyanate.

The present invention is further concerned with a composition comprising catalyst 2 and/or the protic acid of catalyst 2, water and polyol 2.

The relative amounts of catalyst 2 and/or the protic acid of catalyst 2, water and polyol 2 are 0.1–20, 10–55 and 35–85 parts by weight respectively and preferably 0.1–10, 10–55 and 35–85 parts by weight respectively per 100 parts by weight of catalyst 2 and/or the protic acid of catalyst 2, water and polyol 2. Such compositions are made by mixing the Free ingredients.

As said before, catalyst 2 and/or the protic acid of catalyst 2 preferably has a solubility in water of at least 5 gram of catalyst 2 per liter water at 25° C. When catalyst 2 and/or the protic acid of catalyst 2 is used in the above composition it preferably has a solubility of at least 2 g of catalyst 2 and/or the protic acid of catalyst 2 per liter of polyol (2) and water irrespective of its solubility in water alone.

Most preferably catalyst 2 is used in these compositions and processes for making rigid polyurethane foams since it was found that the amount of tin catalyst, required to obtain a similar gel time, was higher when the protic acid of catalyst 2 was used.

The rigid foam is prepared by allowing the aforementioned ingredients to react and foam until the foam does not rise any more.

After rise curing of the foam may be continued as long as desirable. In general a curing period of 1 minute to 24 hours and preferably of 5 minutes to 12 hours will be sufficient. If desired curing may be conducted at elevated temperature. Subsequently the foam may be crushed. It is however preferred to allow the rigid foam obtained to cool down to below 80° C., preferably below 50° C. and most preferablyto ambient temperature prior to crushing. The rigid foam (i.e. before crushing) preferably has a core density of 3–27, more preferably of 3–18 kg/m$^3$ and most preferably of 3–15 kg/m$^3$ (ISO 845).

The rigid foam (i.e. before crushing) prepared has a substantial amount of open cells. Preferably the cells of the rigid foam are predominantly open.

The crushing may be conducted in any known manner and by any known means. The crushing may for instance be conducted by applying mechanical force onto the foam by means of a flat or pre-shaped surface or by applying variations of external pressure.

In most cases a mechanical force sufficient to decrease the dimension of the foam in the direction of the crushing by 1–90%, preferably by 50–90% will be appropriate. If desired crushing may be repeated and/or carried out in different directions of the foam. Due to the crushing the ball rebound increases considerably in the direction of the crushing. Due to the crushing the density of the foam may increase. In most cases this increase will not exceed 30% of the density before crushing.

The foam may be crushed in the direction of foam rise. A special foam is obtained when the crushing is conducted in a direction perpendicular to the direction of foam rise:then a foam is obtained with a highly anisotropic cell structure.

Although it is difficult to give more precise directions for the crushing since it will inter alia depend on the density of the foam, the rigidity of the foam, the type of crushing device used, we believe those skilled in the art are sufficiently aware of the phenomenon of crushing of polyurethane foams that they will be able to determine the appropriate crushing manner and means with the above guidance, certainly in the light of the following examples.

By crushing the ball rebound is increased at least in the directionof crushing. The increase is at least 10%. The core density of the flexible foam is 3–30, preferably 3–20 and most preferably 3–18 kg/m$^3$.

After the crushing the foam may be subjected to a heat treatment in order to reduce the density increase caused by the crushing. This heat treatment is conducted at 70–200° C. and preferably at 90–180° C. for 0.5 minute to 8 hours and preferably for 1 minute to 4 hours.

After the crushing and optionally the heating a novel flexible foam is obtained which has exceptional properties.

Despite the fact that the foam is flexible, it does not show a significant change of the Young's storage modulus E' over a temperature range from −100° C. to +25° C., as described before. The oxygen index of the foam prepared from aromatic polyisocyanates preferably is above 20 (ASTM 2863).

Further it shows a Young's storage modulus at 25° C. of at most 500 kPa, preferably at most 350 kPa, most preferably between 10–200 kPa and a sag factor (CLD 65/25, ISO 3386/1) of at least 2.0, preferably at least 3.5 and most preferably of 4.5–10. CLD hysteresis loss values for the foams are below 55% and preferably below 50% (which is calculated by the formula $$\frac{(A-B)}{A} \times 100\%,$$

wherein A and B stand for the area under the stress/strain curve of the loading (A) and unloading (B) as measured according to ISO 3386/1). Still further these foams can be manufactured with a very low or even negative Poisson's ratio as determined by lateral extension studies under compression of the foams. Finally compression set values of the foams are generally low, preferably below 40% (ISO 1856 Method A, normal procedure).

If the $Tg^h$ is not too high the foam might be used in thermoforming processes to prepare shaped articles. Preferably the $Tg^h$ of the foam is between 80 and 180° C., most preferably between 80° C. and 160° C. for such thermoforming applications. Further it was found that foams, which have been made by using a relatively low amount of the polyols having a low molecular weight, show a small or non-visible $Tg^h$ by DMTA (the modulus change at $Tg^h$ is small or the modulus changes gradually until the foam thermally decomposes); such foams may be used for thermoforming activities as well.

Further the foams show good load-bearing properties like compression hardness values without the use of external fillers together with a good resilience, tear strength and durability (fatigue resistance) even at very low densities. In conventional flexible foams often high amounts of filler need to be used to obtain satisfactory load-bearing properties. Such high amounts of fillers hamper the processing due to a viscosity increase.

The foams of the present invention may be used as cushioning material in furniture and automotive and aircraft seating and in mattresses, as carpet backing, as hydrophilic foam in diapers, as packaging foam, as foams for sound insulation in automotive applications and for vibration isolation in general. The foam according to the present invention further may be used together with other, conventional flexible foams to form composites, like e.g. in mouldings; such composites may also be made by allowing the ingredients for making the conventional flexible foam to form said foam in a mould in the presence of the foam according to the present invention or alternatively by allowing the ingredients for making the rigid foam according to the present invention to form said rigid foam in a mould in the presence of the conventional flexible foam followed by crushing the moulding so obtained. Further the foams according to the present invention may be used as textile cover, as cover for other type of sheets, as carpet underlay or felt-replacement; the so-called flame lamination technique may be applied to adhere the foam to the textile, the carpet or the other sheet. In this respect it is important to note that the foam according to the present invention is suitable to be cut in sheets of limited thickness, e.g. of about 1 cm and less. Still further the foam according to the present invention may be used as insulation material around pipes and containers.

The invention is illustrated by the following examples.

EXAMPLE 1 (comparative)

A polyisocyanate mixture, blend A, was prepared by mixing 184.4 g of polymeric MDJ having an NCO value of 30.7% by weight and an isocyanate functionality of 2.7 and 159.6 g of a uretonimine modified MDI having an NCO value of 31% by weight, an isocyanate functionality of 2.09, a uretonimine content of 17% by weight and 2,4'-MDI content of 20% by weight A catalyst 1 containing blend, blend B, was prepared by mixing 1.35 g of "DABCO" T9 (stannous octoate—catalyst 1—catalyst from AIR PRODUCTS, DABCO is a trade mark) and 90 g of an EO/PO polyol having a nominal functionality of 2, diethylene glycol as initiator, an EO content of 20.2% by weight (all tipped) and an hydroxyl value of 30 mg KOH/g.

A water containing blend, blend C, was prepared by mixing 34.0 g of polyethylene glycol having a molecular weight of 200, 10.6 g of triethylene glycol and 20.5 g of water.

Blends A–C were stabilised in a water bath at 25° C. prior to mixing. 240.8 g of blend A, 63.95 g of blend B and 45.47 g of blend C were brought into a 750 ml paper cup and mixed for 13 seconds with a "HEIDOLPH" mechanical mixer (HEIDOLPH is a trade mark) at a speed of 5000 rpm (index 90). After mixing the reaction mixture was poored in an open 10 l bucket and allowed to react. The gel time amounted to 52 seconds and the rise time amounted to 90 seconds. After at least 15 min the foam was taken out of the bucket and allowed to cool to ambient temperature. A rigid polyurethane foam was obtained. Core foam samples were then cut out of the centre of the foam for a determination of core density and the extractables content. The extractables amounted to 13.9% by weight and the core density was 12 kg/m³.

Determination of Extractables of a Foam

The amount of extractables is determined by a continuous extraction using a soxlet apparatus and methanol as a solvent. The equipment consists of a 500 ml pear-shaped flask, the soxlet apparatus and a Dimroth cooler. A foam sample of 3 to 4 g is cut into pieces of approximately 0.3 cm³, brought into an extraction thimble and mounted in the soxlet apparatus. The extraction is performed with 300 ml methanol. The content of the flask is heated by means of an oil bath which is set at a temperature of 140° C. After refluxing for 3 hours, the methanol is removed from the filtrate by using a rotavapor. Subsequently the weight of the residue in the flask is determined. The amount of extractables is expressed as weight %, calculated from the amount of extracted material and the weight of the extracted foam sample. This amount gives an indication as to the amount of undesirable residual compounds. The higher the figure, the higher is the amount of such compounds.

EXAMPLE 2

In the present examples several catalysts 2 were used. The amount used is indicated in Table 1.

The amount of DABCO T9 was adjusted so as to arrive at the same gel time as in example 1, i.e. about 52 seconds; this amount is given in table 1 as well. All catalysts 2 were added, as solutions in water, to blend C used in example 1; the amount of water in blend C was adjusted so as to arrive at the same level as in example 1 taking the addition of aqueous catalyst 2 solution into account. For the remainder example 1 was repeated and the amount of extractables was determinated. Salts of the acids were obtained by titration of an aqueous solution of the acid with 1 M NaOH or KOH solution.

The amount of hydroxide solution used was calculated based on the molecular weight of the acid, its fInctionality and the desired level of neutralisation.

In Table 1 the salts of the acids are indicated by giving a number—reflecting the percentage of acidic hydrogen atoms which have been replaced—and the metal used, e.g. citric acid, 0.33 Na is the sodium salt of citric acid wherein ⅓ of the acidic hydrogen atoms has been replaced.

TABLE 1

| Catalyst 2 type | Amount of catalyst 1 and 2, % by weight based on total formulation | | Amount of extractables, % by weight | core density, kg/m³ (ISO 845) |
|---|---|---|---|---|
| | Catalyst 2 | Catalyst 1 | | |
| — | — | 0.27 | 13.9 | 12 |
| citric acid, 0.33 Na | 0.193 | 0.92 | 7.5 | 11 |
| BTCA, 1 Na | 0.308 | 0.18 | 8.4 | 11 |
| MBA, 0.5 Na | 0.159 | 0.23 | 11.0 | 11 |
| TDGA, 1 Na | 0.175 | 0.23 | 12.3 | 12 |
| EDTA, 0.75 Na | 0.322 | 0.57 | 10.0 | 12 |
| EDTA, 1 Na | 0.342 | 0.49 | 6.3 | 12 |
| EGTA, 0.5 K | 0.411 | 0.75 | 10.8 | 12 |
| DHPTA, 0.75 Na | 0.349 | 0.87 | 5.5 | 12 |
| HEDTA | 0.250 | 1.00 | 8.6 | 12 |
| HEDTA, 0.25 Na | 0.270 | 0.65 | 10.6 | 11 |
| PAcA | 0.194 | 1.10 | 12.0 | 14 |
| PAcA, 0.25 Na | 0.211 | 0.69 | 6.1 | 13 |
| PAcA, 0.5 Na | 0.224 | 0.51 | 10.1 | 12 |
| PAcA, 0.75 Na | 0.238 | 0.36 | 8.3 | 11 |
| PAcA, 1 Na | 0.248 | 0.27 | 8.6 | 12 |

PAcA: molecular weight 2000

EXAMPLE 3

In the present example PAcA, 0.25 Na is taken as catalyst 2 and the water content was decreased so as to arrive at an isocyanate index of 104. In doing so, the water content of 4.09 weight % on the total formulation as used in Example 1 was reduced to 3.43 weight %. At a catalyst 2 level of 0.211% by weight on the total formulation the catalyst 1 level was reduced from 0.69 to 0.67 weight % on the total formulation to obtain a gel time of about 52 seconds. Core foam samples were then cut out of the centre of the foam. The core density amounted to 14.5 kg/m³ and the amount of extractables was 2.3 weight %. The foam samples were crushed by one compression (70% CLD) at 100 mm/min in the rise direction, followed by crushings (70% CLD of the height after the first compression) at a rate of 500 mm/min in the rise direction of the foam using an INSTRON (INSTRON is a trade mark) mechanical tester mounted with flat plates. After crushing a core density of 17.5 kg/m³ was obtained; the flexible foam obtained had no major glass-rubber transition between −100° C. and +25° C. and had the following properties:

| | |
|---|---|
| Young's storage modulus ratio ($E'_{-100° C}/E'_{+25° C}$) (ISO/DIS 6721-5) | 2.8 |
| Young's storage modulus at 25° C. (kPa) (ISO/DIS 6721-5) | 233 |
| benzene content, % by weight (calculated) | 42.6 |
| ball rebound (%, ISO 8307) | 53 |
| CLD-40% (kPa, ISO 3386/1) | 6.3 |
| SAG factor (CLD 65/25, ISO 3386/1) | 4.5 |

What is claimed is:

1. Process for preparing a rigid polyurethane foam having a core density of 3–27 kg/m³, said process comprising:
   reacting a reaction system comprising
   (a) a polyisocyanate;
   (b) a first isocyanate reactive compound having an average equivalent weight of at most 374 and an average number of isocyanate-reactive hydrogen atoms of from 2 to 8;
   (c) a second isocyanate reactive compound having an average equivalent weight of more than 374 and an average number of isocyanate-reactive hydrogen atoms of from 2 to 6; and
   (d) water;
   wherein said reaction system is reacted in the presence of
   (i) a first catalyst, comprising a tin salt of a carboxylic acid having 2–18 carbon atoms (catalyst 1); and
   (ii) a second catalyst comprising a lithium, sodium, potassium, rubidium, caesium, magnesium, calcium, strontium, and/or barium salt of a protic acid, the acid having at least 2 acidic hydrogen atoms and a $pK_a$ in water 2-10 (catalyst 2) and/or the protic acid of said second catalyst.

2. The process of claim 1, wherein said first catalyst and said second catalyst are each present in an amount of from 0.1–5% by weight, relative to the total amount of ingredients used to prepare said foam, and wherein the ratio of catalyst 1 to catalyst 2 is from 30:70 to 95:5.

3. The process of claim 2, wherein said first catalyst and said second catalyst are each present in an amount of from 0.2–3% by weight, relative to the total amount of ingredients used to prepare said foam.

4. The process of claim 2, wherein said ratio is from 50:50 to 90:10.

5. The process of claim 1, wherein said first catalyst comprises a tin salt of a monocarboxylic, saturated, aliphatic acid having 2–12 carbon atoms.

6. The process of claim 1, wherein 10–90% of the acidic hydrogen atoms of said second catalyst has been replaced by a lithium, sodium, potassium, rubidium, caesium, magnesium, calcium, strontium, and/or barium ion.

7. The process of claim 1, wherein the protic acid has at least 3 acidic hydrogen atoms.

8. The process of claim 1, wherein said second catalyst is selected from the group consisting of sodium and potassium salts.

9. The process of claim 1, wherein said second catalyst has a solubility in water of at least 5 g/liter at 25° C.

10. Process for preparing a rigid polyurethane foam having a core density of 3–27 kg/m³, said process comprising:
   reacting a reaction system comprising
   (a) a polyisocyanate;
   (b) a first isocyanate reactive compound having an average equivalent weight of at most 374 and an average number of isocyanate-reactive hydrogen atoms of from 2 to 8;
   (c) a second isocyanate reactive compound having an average equivalent weight of more than 374 and an average number of isocyanate-reactive hydrogen atoms of from 2 to 6; and
   (d) water;
   wherein said reaction system is reacted in the presence of
   (i) a first catalyst comprising a tin salt of a monocarboxylic, saturated, aliphatic acid having 2–12 carbon atoms; and
   (ii) a second catalyst comprising a sodium and/or potassium salt of a protic acid, the acid having at least 2 acidic hydrogen atoms and a $pK_a$ in water 2-10 (catalyst 2), and wherein 10–90% of the acidic hydrogen atoms have been replaced by said sodium and/or potassium ions;
   wherein said first catalyst and said second catalyst are each present in an amount of from 0.1–5% by weight, relative to the total amount of ingredients used to prepare said foam, and wherein the ratio of said first catalyst to said second catalyst is from 30:70 to 95:5.

11. The process of claim 10, wherein the protic acid has at least 3 acidic hydrogen atoms.

12. The process of claim 10, wherein said second catalyst has a solubility in water of at least 5 g/liter at 25° C.

13. The process of claim 11, wherein said second catalyst has a solubility in water of at least 5 g/liter at 25° C.

14. The process of claim 10, wherein said first catalyst and said second catalyst are each present in an amount of from 0.2–3% by weight, relative to the total amount of ingredients used to prepare said foam.

15. The process of claim 13, wherein said first catalyst and said second catalyst are each present in an amount of from 0.2–3% by weight, relative to the total amount of ingredients used to prepare said foam.

16. The process of claim 1, further comprising crushing said rigid foam to produce a flexible foam having a ratio $E'_{-100°\ C.}/E'_{+25°\ C.}$ of from 1.3–15.0.

17. The process of claim 10, further comprising crushing said rigid foam to produce a flexible foam having a ratio $E'_{-100°\ C.}/E'_{+25°\ C.}$ of from 1.3–15.0.

* * * * *